(12) United States Patent
Silvia et al.

(10) Patent No.: US 6,513,163 B1
(45) Date of Patent: Jan. 28, 2003

(54) EMBEDDED FORWARD REFERENCE AND CONTROL

(75) Inventors: Joseph Silvia, Bedford, NH (US); Stephen J. Graveline, Litchfield, NH (US); Glenn T. Flebotte, Merrimack, NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 09/315,754

(22) Filed: May 20, 1999

(51) Int. Cl.[7] .................. H04N 7/173; H04N 7/16; H04H 1/00; H04Q 7/20; H04B 1/38
(52) U.S. Cl. .................. 725/106; 725/62; 725/126; 455/3.01; 455/3.05; 455/552; 455/426; 455/561
(58) Field of Search .................. 725/62, 106, 126; 455/69–71, 3.01, 3.05, 426, 552, 561

(56) References Cited

U.S. PATENT DOCUMENTS

| | | | |
|---|---|---|---|
| 5,027,426 A | * 6/1991 | Chiocca, Jr. .................. 455/5 |
| 5,701,579 A | * 12/1997 | Dolan et al. .................. 455/3.1 |
| 5,790,523 A | * 8/1998 | Ritchie, Jr. et al. .......... 370/241 |
| 5,802,173 A | * 9/1998 | Hamilton-Piercy et al. .......... 379/56.2 |
| 5,809,395 A | * 9/1998 | Hammilton-Piercy et al. .......... 455/4.1 |
| 5,839,052 A | * 11/1998 | Dean et al. .................. 455/5.1 |
| 5,870,392 A | * 2/1999 | Ann .......................... 370/335 |
| 5,991,605 A | * 11/1999 | Rapeli ........................ 455/76 |
| 6,122,529 A | * 9/2000 | Sabat, Jr. et al. .......... 455/561 |
| 6,334,219 B1 | * 12/2001 | Hill et al. .................. 725/106 |

FOREIGN PATENT DOCUMENTS

| | | |
|---|---|---|
| EP | 0 820 194 A1 | 1/1998 |
| WO | WO 96/10303 A1 | 4/1996 |
| WO | WO 96/24989 A3 | 8/1996 |
| WO | WO 96/24989 A2 | 8/1996 |
| WO | WO 97/36390 A1 | 10/1997 |

\* cited by examiner

Primary Examiner—Bhavesh Mehta
Assistant Examiner—Son P. Huynh
(74) Attorney, Agent, or Firm—Kirkpatrick & Lockhart LLP

(57) ABSTRACT

In a wireless microcell distribution system, a method is provided for embedding reference and control signals within the channel utilized for carrying the telephony signals, thereby eliminating roll off and cable tilt issues which are the result of providing the reference and control signals below the forward CATV band. The elimination of the signals below the forward CATV band also eliminates additional cable spectrum and installation difficulties which are the result of cable tilt in which frequency dependent amplitudes require compensation through the utilization of equalization for each cable microcell integrator.

2 Claims, 4 Drawing Sheets

EMBEDDED FORWARD REFERENCE AND CONTROL

FIELD OF INVENTION

This invention relates to wireless microcell distribution systems, and more particularly to the embedding of forward reference and control signals within the cable channel utilized for transporting telephony signals to and from a microcell connected to the cable.

BACKGROUND OF THE INVENTION

In the past, wireless communication has been established between a wireless transceiver and cell sites which are spaced to be able to receive transmissions from the transceivers and to transmit corresponding telephony signals over landlines to either landline-based telephones or other wireless handsets. The problem with cell sites is in general the cost and siting of cell site towers. In an effort to minimize cost and increase reliability, cable television networks have been utilized to transport the telephony signals, with microcells positioned at various points along the cable to receive signals from the wireless transceivers and transmit signals back to the transceivers in a full duplex operation. In such systems, the cables are typically already in place and carry CATV signals.

In a wireless microcell distribution system, a base station is connected at one end to the telephone network switch and at the other end to. the cable that is used for connecting the microcells, hereinafter referred to as cable microcell integrators. Each of the cable microcell integrators is provided with transmit and receive antennas and transceivers which permit communication with the wireless transceivers. As such, each of the microcells functions as a cell site, with the microcells being interconnected by the cable. This type of system eliminates costly towers and siting by providing a number of microcells spaced out along the same cable that already carries CATV signals. Thus, in the past, existing cable television networks have been adapted to carry telephony signals between a telephone network and a remote transceiver site, the coverage of which defines cells or sectors.

In these systems, the base transceiver acts as the interface between the telephone network and the wireless telephones. To carry the wireless telephony signals over a broad band distribution network, a predetermined bandwidth on the network is typically allocated for this purpose. To most efficiently use a given bandwidth to carry wireless telephony signals between wireless telephones and the telephone network, code, frequency or time division multiplexing is utilized to support code division multiple access, time division multiple access, frequency division multiple access. This requires appropriate base station equipment that acts as the interface with the telephone network and the wireless telephone system.

The base station is typically coupled to a, head end interface converter, the purpose of which is to provide the required number of telephony signals, and both control and reference signals to a coupler which couples these signals to a cable-to-fiber transducer. The cable-to-fiber transducer injects the requisite signals into the cable, with a splitter being provided at a point on the cable to split out CATV signals and the telephony signals. The splitter provides the telephony signals as well as the CATV signals, to a cable microcell integrator connected to the cable, with the microcell having three antennas, one a transmitting antenna and the others a primary and diversity antenna which serve as the receiving antennas.

Control and reference signals are called forward control and reference signals because they are the signals transmitted from the head end interface converter to the microcells to control the associated cable microcell integrators. The forward control signal typically controls frequency channel assignment and the power levels utilized by the microcells, with the forward reference signal provided to permit phase locking of the oscillators in the microcell.

It will be appreciated that the communication between the head end interface converter and each of the microcells is bi-directional. In the forward direction, control over power and gain of each of the microcells is provided through the forward signal to each of the microcells. Likewise, channel assignment for the telephony signals and the CATV signals is provided by forward control signals. Moreover, fault enable and disable control signals are provided in the forward direction to each of the modules. Additionally, transmit enable and disable signals are also provided to the microcells, along with a status monitoring and fault reporting signal. Moreover, software updates for each of the modules can be provided by the forward control signal.

In the reverse direction, signals from the module are transmitted to the head end interface converter which include responses to all of the queries contained in the forward control signals. These reverse control signals are provided back to the head end interface converter at frequencies much below the forward portion of the CATV band.

In the past, these forward control and forward reference signals have been fixed at 52.0 MHz and 52.5 MHz respectively, which are just below the forward position of the CATV band. It will be appreciated that the forward portion of the CATV band typically runs from 52.7 MHz to 800 MHz, with the telephony signals being assigned to a particular Cable TV channel, which in general is 6 MHz wide.

The problem with locating the forward control and reference signals below the forward portion of the CATV band is first the problem of roll off. Roll off occurs when equipment on the cable plant is set to operate within the allocated band. The forward control and reference signals being below this band are attenuated due to the out of band nature of these signals. In particular, couplers and the line amplifiers operate within the forward CATV band and attenuate signals to either side of that band in a roll off which is multiplied with the large number couplers and line amplifiers utilized in the cable plant. While the loss at a single coupler or line amplifier is minimal, when these couplers and amplifiers are cascaded, the roll off effect on the forward control and reference signals is significant.

The second problem with locating the forward control and reference signals below the forward end of the CATV band is a problem called cable tilt. Cable tilt refers to the difference in attenuation with frequency of signals transmitted along the cable. It is noted that the higher the frequency the greater the loss per unit length of cable. For telephony signals at a given frequency channel, the amplitude difference between the reference and control signals below the forward CATV band and the telephony signals within the forward CATV band is significant. One can therefore no longer set the power levels at each microcell to the appropriate levels due to the variable distance between the head end system and the microcells in which the control and reference signals are attenuated differently than the in band telephony signals. The difference in amplitudes with cable length has resulted in the placement of equalizers at each module, with the equalizers adjusted to take into account this difference in amplitude.

Moreover, both the effects of roll off and cable tilt combine to make the imbalance worse. This makes it even more difficult to equalize the signals at each of the microcells.

SUMMARY OF THE INVENTION

Rather than placing the forward control and reference signals below the forward CATV band in the subject invention these signals are embedded in the cable channel used for telephony. As a result, there is no disparity in amplitude between the telephony signals and the forward control and reference signals due to the co-location of these signals with the channel. The result is that there is no roll off because all of the couplers and line amplifiers normally used are operating within specification and no additional amplification for the prior out-of-band signals is necessary. Also with the co-location of the forward control and reference signals in the telephony channel, there is no frequency-related or distance-dependant loss. There is no difference in attenuation at a microcell for the control and reference signals and the telephony signals. There is no equalization required at each module which eliminates the problem of cable tilt.

Moreover, it will be appreciated that no extra spectrum is utilized and installation difficulties associated with the provision of equalizers are eliminated.

Importantly, the elimination of cable tilt and roll off by the embedding of the forward reference and control signals means that the cable plant need not be altered in any way to provide for the telephony service. This means that no additional amplifiers or equalizers are required to be inserted into the cable system as is the case when the control and reference signals are located below the forward CATV band.

In summary, In a wireless microcell distribution system, a method is provided for embedding reference and control signals within the channel utilized for carrying the telephony signals, thereby eliminating roll off and cable tilt issues which are the result of providing the reference and control signals below the forward CATV band. The elimination of the signals below the forward CATV band also eliminates additional cable spectrum and installation difficulties which are the result of cable tilt in which frequency dependent amplitudes require compensation through the utilization of equalization for each cable microcell integrator.

BRIEF DESCRIPTION OF THE DRAWINGS

These and other features of the Subject Invention will be better understood taken in connection with the Detailed Description in conjunction with the Drawings, of which.

DETAILED DESCRIPTION

Figure 1:
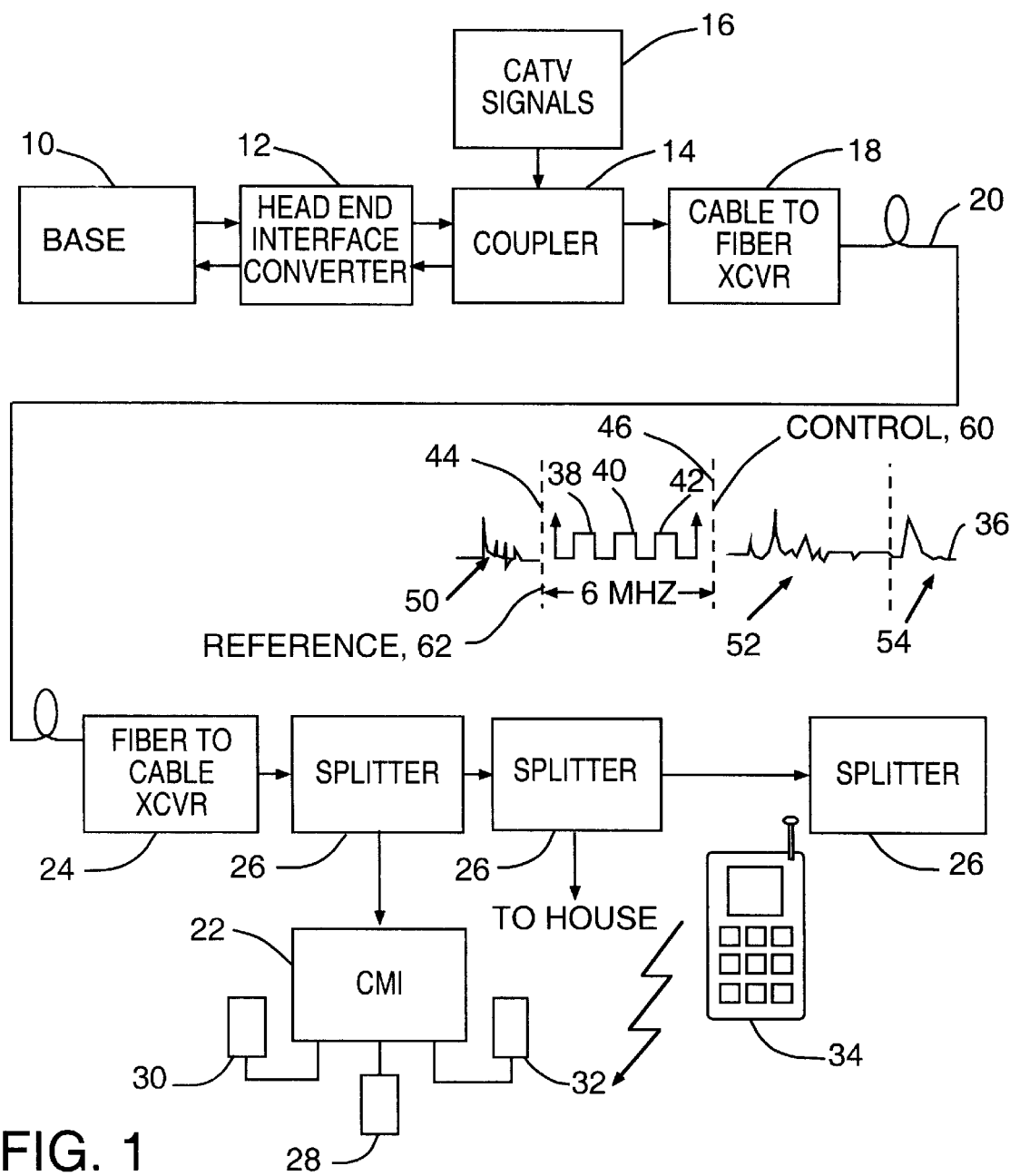
FIG. 1 is a block diagram of a typical wireless microcell distribution system, showing the provision of reference and control signals within the cable channel utilized for the telephony signals.

Referring now to FIG. 1, in a typical Wireless microcell distribution system, a base station 10 is coupled to a head end interface converter 12 which is in turn coupled to a coupler 14 to which are coupled CATV signals 16. The output of coupler 14 is coupled a cable-to-fiber transceiver 18, which transmits signals over cable 20 to a cable microcell integrator 22 via fiber-to-cable transceiver 24 and splitter 26. The cable microcell integrator 22 includes three antennas, with the central antenna 28 being the transmit antenna. As to the receive antennas, antenna 30 is the primary antenna, and antenna 32 is the diversity antenna. Cable microcell integrator is designed to communicate with a wireless handset 34. In one embodiment, a CDMA system is used in which cable microcell integrator 22 communicates over one of three different carriers to the wireless terminal.

As can be seen by waveform 36, each of these carriers, herein designated 38, 40 and 42, are within a cable channel designated by dotted lines 44 and 46 to constitute the telephony channel. To either side of this 6-MHz wide telephony channel are a number of cable channels 50, 52 and 54 which carry CATV signals. As illustrated, one of the cable channels is designated for telephony.

As mentioned hereinbefore, it was common practice prior to the subject invention to provide forward reference and control signals at fixed frequencies below the forward CATV band. In order to avoid the deleterious effects of providing these forward control and reference signals outside the forward cable spectrum, in the subject invention, the forward control and reference signals are provided within a CATV channel allocated for telephony. In one embodiment, a forward control signal 60 is located at the high end of the channel, whereas a reference signal 62 is located at the low end. These two signals sandwich the multiple carriers such that for the present purposes it is said that the forward control and reference signals are embedded in the signals carried by the cable channel dedicated to telephony.

Figure 2:
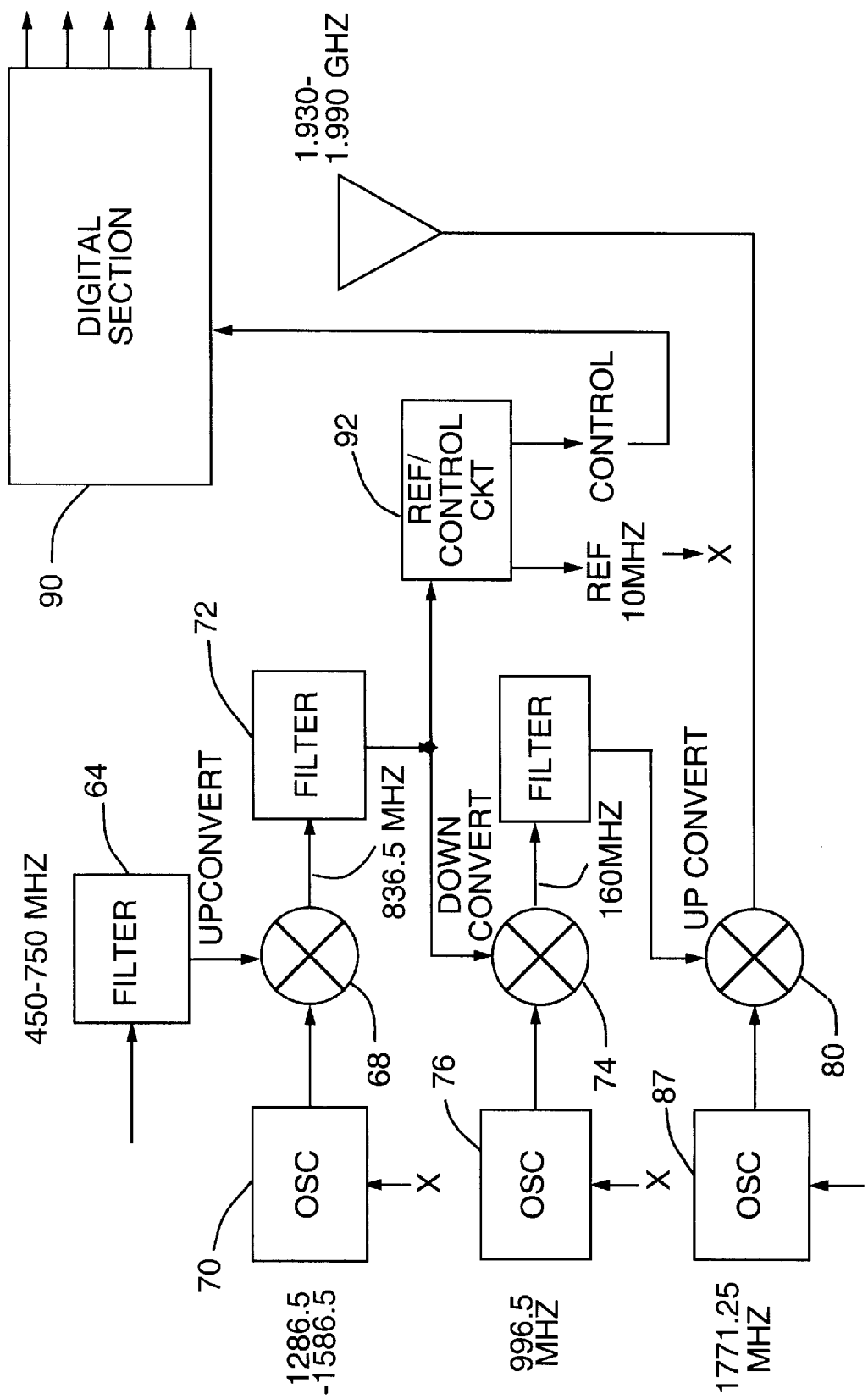
FIG. 2 is a block diagram of the cable microcell integrator of FIG. 1 which takes multiple telephony signals, filters them, up converts and then down converts to provide one telephony signal which is transmitted by the transmit antenna of the associated cable microcell integrator.

Referring now to FIG. 2, the extraction of the reference and control signals is described in which signals from splitter 26 are filtered by a filter 64, which is a band pass filter designed to pass the 450–750 MHz band. The output of filter 64 is up converted at 68 through the utilization of a local oscillator 70, which has a variable frequency output typically between 1286.5 MHz and 1586.5 MHz. The resultant output is centered on 836.5 MHz, with the signal being filtered by a band pass filter 72, the purpose of which is to pass only the CATV channel dedicated to telephony signals.

Prior to describing the extraction of the reference and control signals, it will be appreciated that the output of filter 72 is down converted by mixer 74 to a 160-MHz signal to permit usage of a saw filter 78 through the use of a second local oscillator 76, in one embodiment tuned to 996.5 MHz. The output of mixer 74 is coupled to a saw filter 78. Use of a saw filter enables pulling out the particular carrier to be transmitted. It will be appreciated that oscillator 76 is tunable within a range to specify which of the multiple carriers is to be transmitted.

Thereafter, the output of filter 78 is applied to a mixer 80 to up convert the output to the transmit frequency for the particular carrier, with the transmit frequency being in the range from 1930 to 1990 MHz. In order to perform the up conversion, a third local oscillator 87 is utilized which is set at a frequency of 1.77125 gigahertz, with oscillator 87 being tunable over a range to set the particular transmit channel desired.

It will be appreciated that the transmission and reception of signals by cable microcell integrator 22 is dependent upon a number of factors. One of the more important factors is to make sure that the transmitted frequency is sufficiently accurate. The accuracy of the transmit frequency in general must exceed $5 \times 10^{-8}$, a requirement not easily met. In order to meet this requirement, the reference signal generated by the head end interface converter is utilized as an input to local oscillators 70, 76 and 87 to permit the accurate setting of the transmit frequency. Additionally, information transmitted by the control signal is utilized in the digital section 90 of cable microcell integrator 22 to permit control of such things as power and gain, channel assignment, fault enable/disable criteria, status monitoring/fault reporting requirements, and software downloads.

As discussed hereinbefore, these reference and control signals are part and parcel of the control of the cable microcell integrator 22, and it is the provision of these signals within the telephony cable channel which provides for the aforementioned benefits.

The extraction of the reference and control signals is performed by a reference and control circuit 92, which provides a stable 10 MHz reference signal in one embodiment and control signals to digital section 90.

Figure 3:
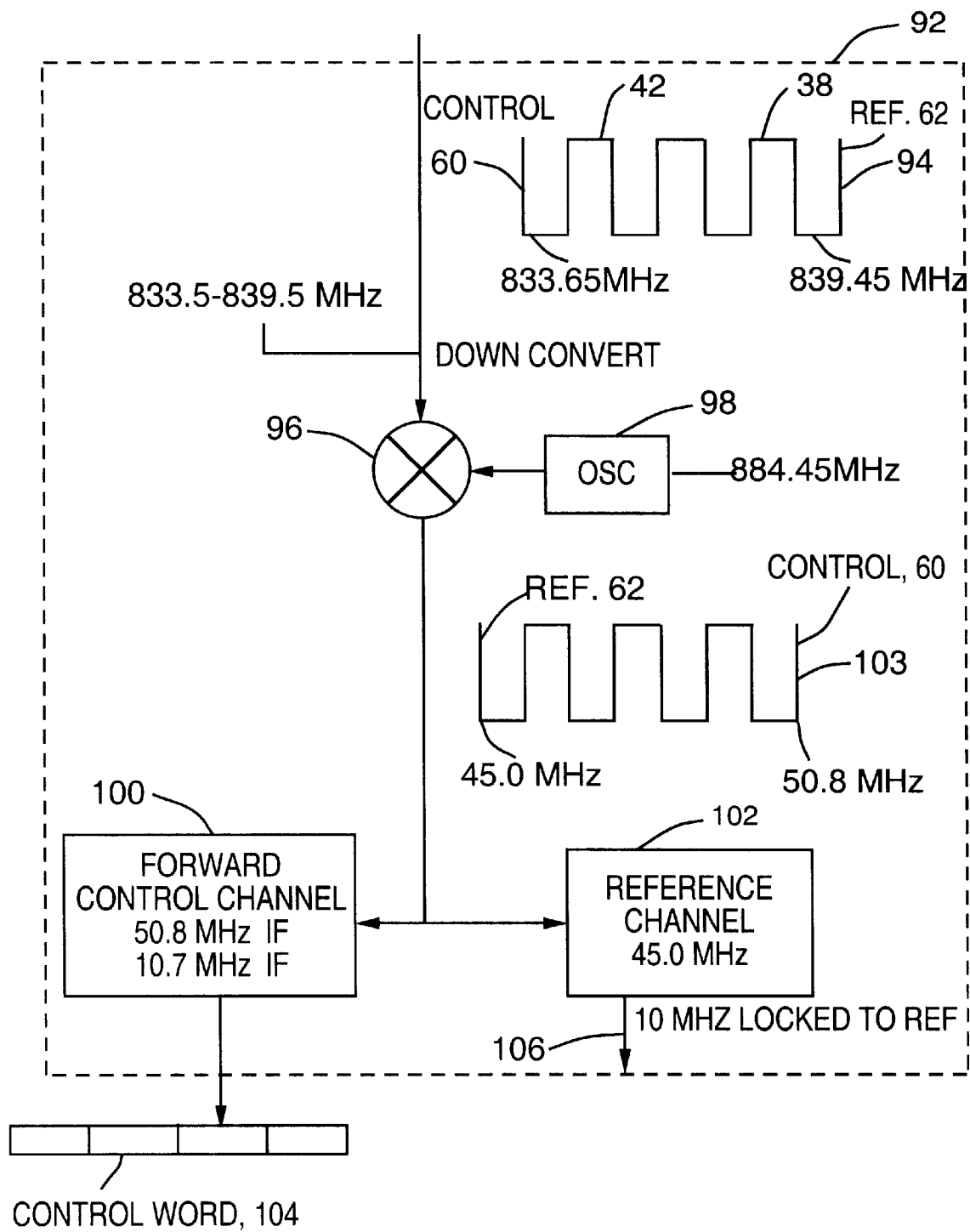
FIG. 3 is a block diagram of a control and reference signal extraction circuit used in the cable microcell integrator of FIG. 2; and, FIG. 4 is a detailed block diagram of the system utilized to recover the forward control and reference signals at the cable microcell integrator.

How this is accomplished is shown in FIG. 3. In one embodiment, circuit 92 is provided with an input signal having the waveform illustrated at 94 in which the control signal is provided within the telephony channel at 833.65 MHz, whereas the reference signal is provided at 839.45 MHz. These two signals, as mentioned before, sandwich carriers 38, 40 and 42. Note that as illustrated by waveform 94, the up-conversion process of the input signals at 68 results in a reversal in the position of all signals within the 6 MHz CATV channel. The signals from filter 72 are down converted at a mixer 96, which is coupled to a local oscillator 98 that is set to 884.45 MHz. Note that the down converted signals are in a frequency range of 45 to 50.8 MHz. The output of mixer 96 is applied to a forward control channel circuit 100 and a reference channel circuit 102, respective outputs of which are a control word 104 and a 10 MHz reference frequency 106 locked to the reference signal.

Note that as illustrated by waveform 103, the down conversion of the input signal results in a reversal in the position of all signals within the 6 MHz CATV channel, including the reference and control signals as well as a down conversion of their frequencies. The result is the reference frequency at 45.0 MHz, whereas the control frequency is at 50.8 MHz. As will be seen, the 45.0 MHz reference frequency is down converted by reference channel circuit 102 to the stable 10-MHz frequency, whereas the 50.8-MHz carrier for the digital message is down converted at circuit 100 to 10.7 MHz.

Figure 4:
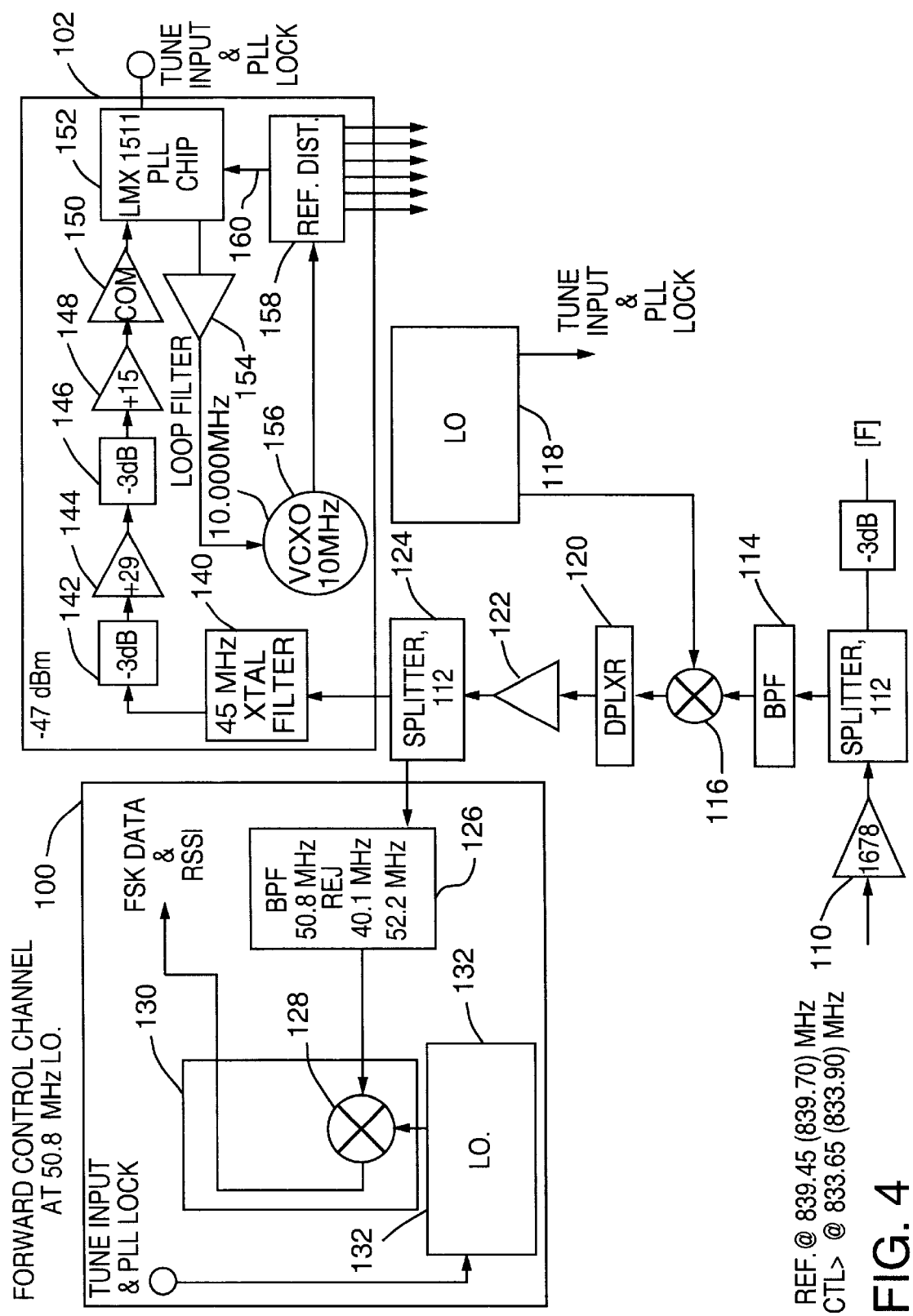

Referring now to FIG. 4, the operation of, the forward control channel circuit and reference channel circuits is more fully described. The aforementioned reference and control signals are applied to an amplifier 110 and then are split at 112 and applied to a band pass filter 114 set to a frequency of 836.5 MHz to further eliminate cable plant signals. Thereafter, the output of filter 114 is mixed at 116, with the output of local oscillator 118 providing a down converted signal which is then applied to a diplexer 120 and thence to an amplifier 122. The output of amplifier 122 is split at 124 and is provided to a band pass filter 126 set to the aforementioned 50.8 MHz center frequency. Signals from band pass filter 126 are applied to a mixer 128 in an FSK receiver 130, with the input signals mixed with the output of local oscillator 132 set at 40.1 MHz. The result is FSK data and a receive signal strength indicator which is utilized by digital section 90 for the control of cable microcell integrator 22. It is noted that local oscillator 132 is tunable and is phase-locked to the reference signal as will be described.

Referring now to the provision of a stable 10 MHz reference signal which is phase-locked to the aforementioned reference signal, the output of a splitter 124 is applied to a crystal filter 140 set in one embodiment to 45 MHz. The purpose of t his filter is to provide a sharp rejection of everything but the reference signal, thereby eliminating prior problems with less selective filters leading to the inability to phase lock to the reference signal. The output of crystal filter 140 is applied to a −3 dB pad 142 and thence to amplifier 144 provided with a pad 146 between it and amplifier 148 to provide appropriate signal conditioning. Thereafter, the output of amplifier of 148 is provided to a comparator 150, which forms the input to a phase lock loop circuit 152. Optionally phase lock loop circuit 152 is tunable to permit selection of locking reference frequencies. The output of circuit 152 is provided to a loop filter 154, with the output of loop filter 154 provided to a voltage controlled crystal oscillator 156, the output of which is a stable 10 MHz signal. This signal is applied to a distribution circuit 158 for distributing the exceedingly accurate 10-MHz reference signal to six different local points in one embodiment.

The phase locking occurs such that the output of voltage controlled crystal oscillator 156 is applied back to phase lock loop chip 152 over line 160 where it is compared to the reference frequency which has been filtered and signal processed.

The result is an exceedingly accurate and stable reference signal available at the cable microcell integrator, with the reference signal being accurate to one part in $10^8$ of the reference signal from the head end interface converter.

It will be appreciated that in the past, provision of sufficiently accurate reference frequencies at the module has been difficult in order to achieve the one part in $10^8$ accuracy. As a result of the initial inability to provide such accuracy, fixed frequency reference signals could not be embedded in the telephony channel. Rather they were provided out of band, namely outside the low end of the forward cable frequency spectrum. With the subject system it is now possible to accurately establish the frequency of the reference signal and to be able to place it within a very narrow filter bandwidth. This permits isolation of the reference signal from the other signals in the particular cable channel, namely the telephony signals; and also provides a signal which is sufficiently isolated from adjacent cable channel signals. By being able to provide a sufficiently accurate frequency for the reference signal, and by providing a sufficiently sharp, in this case, crystal filter to be able to isolate the accurate reference signal, one is able to include or embed the reference signal within the cable channel dedicated to telephony.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a wireless microcell distribution system in which a channel is dedicated for carrying telephony signals amongst CATV signals carried on other channels, a method of eliminating roll off and cable tilt which are the result of providing reference and control signals below the forward CATV band, comprising:

locating the forward reference and control signals within the channel dedicated for carrying telephony signals, wherein the forward reference and control signals sandwich the telephony signals in the dedicated telephony channel.

2. Apparatus used in a wireless microcell distribution network for developing forward reference and control signals to be used in the operation of a cable microcell integrator comprising;

means at said cable microcell integrator for detecting signals in a channel dedicated for telephony said signals including telephony signals and forward reference and control signals transmitted within said dedicated channel, said forward reference and control signals sandwiching the telephony signals;

means for filtering out said forward reference and control signals;

means for down converting the signaling in said dedicated channel; and, whereby the order of said forward reference and control signals is reversed.

* * * * *